United States Patent [19]

Neél et al.

[11] 4,306,955

[45] Dec. 22, 1981

[54] PHOTOPOLYMERIZED ACRYLIC POLYMER ESSENTIALLY DEVOID OF RESIDUAL MONOMER(S)

[75] Inventors: Jean Neél, Lyons; Jean Boutin, Mions, both of France

[73] Assignee: Rhone-Poulenc Industries, Paris, France

[21] Appl. No.: 137,484

[22] Filed: Apr. 4, 1980

[30] Foreign Application Priority Data

Apr. 5, 1979 [FR] France .............................. 79 08596

[51] Int. Cl.$^3$ ..................... C08L 33/00; C08L 33/02; C08F 2/46; C08F 4/00
[52] U.S. Cl. ......................... 204/159.22; 204/159.23; 525/344; 528/487
[58] Field of Search ....................... 528/487; 525/344; 204/159.23, 159.22

[56] References Cited

U.S. PATENT DOCUMENTS

| | | | |
|---|---|---|---|
| 2,960,486 | 11/1960 | Pye | 260/45.7 S |
| 3,755,280 | 8/1973 | Saunders | 528/487 |
| 3,780,006 | 12/1973 | Zweigle | 528/487 |
| 4,178,221 | 12/1979 | Boutin et al. | 204/159.23 |
| 4,187,363 | 2/1980 | Marshall et al. | 528/487 |

*Primary Examiner*—William F. Hamrock
*Attorney, Agent, or Firm*—Burns, Doane, Swecker & Mathis

[57] ABSTRACT

The thin rubbery layer resulting from the photopolymerization of a thin layer of an aqueous solution of acrylic monomer(s) is face surface coated with a coating of an alkali metal sulfite and/or metabisulfite, and is then shredded, dried and ground to provide acrylic polymer/copolymer from which virtually all residual monomer has been depleted and which is well suited for use as a polymeric flocculant.

17 Claims, No Drawings

PHOTOPOLYMERIZED ACRYLIC POLYMER ESSENTIALLY DEVOID OF RESIDUAL MONOMER(S)

BACKGROUND OF THE INVENTION

1. Field of the Invention

The present invention relates to the preparation of water-soluble, high molecular weight organic polymers/copolymers especially adapted as polymeric flocculants for the treatment of waste and other impure waters, and, more especially, to the preparation of high molecular weight, water-soluble acrylic polymers or copolymers essentially devoid of residual monomer or monomers.

2. Description of the Prior Art

It is well known to this art that, for reasons of toxicity, it is exceedingly important to utilize for water treatment, e.g., water purification, organic water-soluble polymers or copolymers containing but very slight amounts of residual monomer or monomers. Indeed, different government regulations have set an acceptable upper limit on the content of residual monomer or monomers (particularly in the case of acrylamide polymers or copolymers) at 0.05% by weight, with respect to the weight of the dry polymer.

The preparation of acrylic polymers or copolymers by photopolymerization under ultraviolet irradiation too is well known to the prior art. Compare U.S. Pat. No. 4,178,221 which features the preparation of water-soluble acrylic polymers of high molecular weight containing little or no free monomer. According to this particular process, an aqueous solution of acrylic monomer or monomers is continuously deposited onto a support in the form of a thin layer, said solution containing a photopolymerization promoter in an amount of 0.005 to 1% by weight with respect to the total weight of the monomer or monomers, and also containing less than 1 mg oxygen per liter of solution; the thin liquid layer is then subjected to irradiation at wavelengths between 300 nm and 450 nm for 1 to 20 minutes, the average power of such radiation being between 20 and 300 watts/m$^2$, the gaseous atmosphere enveloping the thin liquid layer having an oxygen content of less than 5% by volume, and the support being cooled in order to facilitate heat removal. Next, the thin layer thus subjected to the onset of photopolymerization is maintained on the cooled support and under an atmosphere free of oxygen and is then exposed to a second radiation stage, at wavelengths between 300 and 450 nm for 1 to 20 minutes, the average power of such radiation being between 300 and 2000 watts/m$^2$; thence, in order to effect removal of the residual monomers present in the resulting, at least partially solidified thin layer, the same is stripped from the support and subjected to yet another stage of irradiation, preferably in a cool air atmosphere, said irradiation being at wavelengths of between 300 and 450 nm for 30 minutes to 3 hours, and with the average power of active radiation being between 20 and 300 watts/m$^2$. The resultant film is subsequently cut into fragments, dried and ground into powder. This process yields polymer having a content of residual monomer or monomers of less than 0.05%. However, it displays the disadvantage of requiring a lengthy period of third-stage irradiation (30 minutes to 3 hours) under conditions differing from those of the earlier irradiation stages. Thus, such prior art process is both time consuming, as well as expensive.

It too has been postulated that the aforesaid lengthy period of irradiation of from 30 minutes to 3 hours could be avoided by simply extracting the residual monomer(s) with any suitable solvent, such as dilute methanol. And indeed the ultimate product of photopolymerization may be treated with methanol to dissolve the residual monomers, but this is a lengthy, costly and difficult operation, especially in light of the hazardous and toxic character of methanol.

Other techniques are also known for reducing the residual monomer content of water-soluble polymers, e.g., those featuring the use of the alkali metal sulfites or metabisulfites. Such sulfites or bisulfites are post-polymerization additives, being introduced after completion of the polymerization into aqueous mixtures containing the polymer, the polymer then being dried. If such compounds are present during polymerization, however, they interfere with the polymerization catalyst and upset the process equilibrium. Utilization of such compounds may thus be considered to be confined to already polymerized products. It is also known that it is fundamentally impossible to attain the desired results by interacting the sulfite or bisulfite with a powder of the polymeric flocculant, such as that obtained after drying. In the case wherein a solid, rubbery product is obtained after polymerization, and still containing a high proportion of residual monomer or monomers (0.5% of acrylamide monomer, for example), no means are provided by the prior art for interreaction between the sulfite or bisulfite and the product of photopolymerization.

Hence, it will be seen that a serious need exists in this art for a facile and speedy process for the preparation of water-soluble acrylic polymers or copolymers having a very low residual content of starting material monomer or monomers, and especially for the preparation of such polymers/copolymers well suited as markedly effective polymeric flocculants.

SUMMARY OF THE INVENTION

Accordingly, a major object of the present invention is the provision of a novel process for the photopolymerization of acrylic monomer(s) into improved polymeric flocculants, which polymeric flocculants are conspicuously devoid of residual monomer(s), and the photopolymerization itself being free of those aforenoted disadvantages and drawbacks.

Briefly, it has now surprisingly been determined that if an alkali metal sulfite or metabisulfite is interacted with that thin, rubbery layer resulting from the thin layer photopolymerization of acrylic monomer(s), such layer will be essentially completely depleted of its residual monomer(s) content, whereby there is rapidly and quite simply obtained an improved polymeric flocculant which meets all prevailing government toxicity standards.

DETAILED DESCRIPTION OF THE INVENTION

More particularly, the photopolymerization, per se, consistant with the present invention, is facilely carried out in accordance with known techniques, advantageously in the presence of either oxygen or air, such as described, for example, in French Pat. No. 2,327,258 which features the incorporation in the photopolymerization recipe of at least 1 ppm of a water-soluble anthraquinone derivative devoid of substituents in the 1-, 4-, 5- and 8-positions and at least 10 ppm of dissolved chloride ion.

The invention, thus, itself features a process for the preparation of high molecular weight acrylic polymers or copolymers having a very low content in residual monomer(s), and wherein a thin liquid layer of an aqueous solution of an acrylic monomer or acrylic monomers having a pH between approximately 4 and 14, and further comprising a photopolymerization promoter, is continuously deposited on a support and the thin liquid layer exposed to irradiation with radiation having wavelengths between about 300 nanometers and 450 nanometers for such period of time until a thin rubbery layer results, the subject photopolymerization being characterized in that the resultant rubbery layer is first coated on at least one of its two face surfaces with at least one alkali metal sulfite and/or metabisulfite, and that the thus coated thin rubbery layer is next cut into flakes, or otherwise fragmented, and such flakes, etc., are thence dried and ground into powder.

The powder obtained according to the invention displays a content of residual monomer or monomers of less than 0.05%.

According to a preferred embodiment of the invention, a mixture of an alkali metal sulfite and/or metabisulfite is utilized for the coating operation, and which itself is in powder form. Even more preferably, the powder used for coating has a grain size of less than 0.1 mm.

According to another preferred embodiment of the invention, at least one of the two face surfaces of the thin rubbery layer is coated with an amount of sulfite and/or metabisulfite between approximately 0.1% and 3% by weight with respect to the total weight of said rubbery layer. Preferably, an amount between 0.3% and 2% is used. It is preferred to employ either sodium sulfite, $Na_2SO_3$, or sodium metabisulfite, $Na_2S_2O_5$.

When the pH of the aqueous solution of the starting material monomer or monomers is initially less than 12, a flocculant having a very low content in residual monomer or monomers is always obtained, but such flocculant does not always provide a clear solution, or same has a lower molecular weight which adversely affects its flocculating capability. In such cases, it is advantageous, but not obligatory, to utilize for the coating of the rubbery layer, simultaneously with the alkali metal sulfite and/or metabisulfite, at least one inorganic carbonate selected from the group comprising the alkali metal carbonates and ammonium carbonate. Such carbonate does not itself participate or aid in the elimination or exhaustion of the residual monomer(s) but serves to maintain the optimum flocculant activity or capability of the resultant polymer. In this case, it is preferred to utilize an admixture of the alkali metal/ammonium carbonate and the alkali metal sulfite and/or metabisulfite containing approximately 0 to 60% by weight of the alkali metal/ammonium carbonate and 40% to 100% by weight of the alkali metal sulfite and/or metabisulfite. According to a preferred embodiment of the invention, the alkali metal/ammonium carbonate utilized is sodium carbonate.

When the pH of the aqueous solution of the starting material monomer or monomers is initially higher than 12, the addition of the alkali metal/ammonium carbonate is not necessary to obtain a polymer having an optimized degree of flocculant activity.

The process according to the invention is especially well suited for the photopolymerization of an aqueous solution of a monomer or monomers deposited on suitable support in a thin layer having a thickness of approximately 2 to 20 mm and containing 0.005 to 1% by weight with respect to the monomer or monomers of a photopolymerization promoter, and containing less than 1 mg dissolved oxygen per liter of solution. This layer is subsequently exposed for 5 to 20 minutes to the action of radiation having the aforementioned wavelengths, the average power of such irradiation being 20 to 2000 watts/$m^2$ and same being progressively applied, with the gaseous atmosphere enveloping the liquid layer having an oxygen content of less than 5% by volume and the support preferably being cooled to dissipate or eliminate the heat generated during polymerization.

The process of the invention is well adapted for the photopolymerization of acrylic monomers into polymers or copolymers of, e.g., acrylamide, methacrylamide, acrylonitrile, acrylic and methacrylic acids, their salts and esters, aminoalkyl acrylates and methacrylates and quaternized derivatives thereof, the hydroxyalkyl(-meth)acrylates, and admixtures thereof. It is especially well adapted for the photopolymerization of acrylamide, because the polyacrylamides are those particular polymers most effected by the aforenoted regulations and standards.

Depending upon the particular nature of the monomer photopolymerized, its concentration in the initial aqueous solution may vary. Thus, for acrylamide or mixtures thereof with the alkali metal acrylates, such concentration will typically range from between 20 and 60% by weight, and preferably between 40 and 50%. If it is desired to prepare a cationic polymer (a polymer having positive charges along its backbone) comprising a quaternized aminoalkyl methacrylate (chloride), the concentration must be higher; advantageously it is between 40 and 90% by weight, preferably between 50 and 85%. If it is desired to obtain a quaternized aminoalkyl methacrylate and acrylamide copolymer, useful concentrations of these monomers are between 40 and 85%.

The starting solution of the monomer or monomers necessarily contains, prior to its deposition on the support, a photopolymerization initiator that is preferably soluble in the monomer or in at least one of the monomers. The photoinitiators that may be used in the process of the invention are of known type. Representative are benzoin and the alkyl ethers thereof, such as, for example, the methyl, ethyl and propyl ethers.

In a general manner, the process according to the invention may be carried out as follows:

The solution to be polymerized is prepared with the exclusion of air therefrom, because the operation is to be performed in an oxygen-free atmosphere and in the absence of light from the moment that the photoinitiator is incorporated. After optionally degassing the solution with nitrogen to eliminate any oxygen, said solution is deposited on an endless stainless steel belt comprising two lateral flanges (for retaining the solution). The gaseous atmosphere or environment over the belt is confined by suitable glass plates and same is purged of oxygen by means of a stream of nitrogen when the operation is to be conducted in the absence of oxygen. Above the endless metal belt onto which the solution is deposited, a bank or plurality of lamps is disposed (for example, low pressure mercury vapor lamps). The underside of the metal belt is cooled during the polymerization process via jets of cold water.

After 5 to 20 minutes of polymerization, a rubbery layer is obtained, which is then removed or stripped from the steel support.

Coating of such resultant rubbery layer with the alkali metal sulfite and/or metabisulfite, and optionally with the carbonate may be effected by any suitable means. A simple coating application utilizing brushes is one example.

The face surfaces of the photopolymerized layer are themselves slightly adhesive, and more or less malleable, such that the powdered mixture is adhered thereto simply by means of friction and pressure.

The layer coated in this manner is next subjected to a cutting operation into flakes or the like, by means of any suitable apparatus which both cuts and also intimately admixes the inner and outer sections of the layer and thus promotes the effective action of the powdery mixture which had been coated onto the face surfaces of said rubbery layer. A shredder of meat grinder type too may be used, wherein a metal Archimedes screw rotates in a cylinder such that the external sections of the thread are closely contiguous the internal surface of the cylinder, but without actually touching same. The screw is thus able to force the rubbery layer against a perforated plate having a large number of holes, which acts as a draw plate for the comminuted product. The diameters of such holes are typically several millimeters (1–10 mm) and the number of holes is such that the force necessary for extrusion is not incompatible with the power applied to move the screw. The extrusion is aided by blades that are integral with the screw and too are rotating as the extrusion is converted into flakes.

The plastic flakes recovered at the outlet of the shredder still contain 60 to 40% water, a small amount of sulfite and/or metabisulfite and possibly also the carbonate and trace amounts of residual monomer or monomers.

The higher temperature employed during the subsequent drying of the flakes completes the mixing action. After final grinding, the powders of the polymer of copolymer obtained contain less than 0.05% of residual monomer or monomers.

The subject process may be continuously operated. The endless steel belt then is conveyed under lamps of increasing intensity, and the post-polymerization operations are also conducted continuously.

In order to further illustrate the present invention and the advantages thereof, the following specific examples are given, it being understood that same are intended only as illustrative and in nowise limitative.

EXAMPLE 1

A solution was prepared from the following ingredients:

[i] Water: 130 g,
[ii] Acrylic acid: 35.1 g,
[iii] NaOH, 50%: 39 g, and
[iv] Sodium gluconate: 1.8 g.

To this solution, 95 g of acrylamide powder were added which dissolved endothermically. While excluding light, 1.25 ml of a solution of 34 g/l benzoin isopropyl ether in acrylic acid were added. The pH was adjusted to 12 with 10% sodium hydroxide. The solution was then degassed with nitrogen to eliminate the oxygen. Said solution was next deposited on a stainless steel belt fitted with bordering flanges, 35 cm long and 18 cm wide, such as to form a layer having a uniform thickness of approximately 4.5 mm. The gaseous atmosphere enveloping the liquid layer, and confined by a glass plate arrangement, had been purged of oxygen prior to the introduction of the liquid mixture by means of a stream of nitrogen.

The thin liquid layer was exposed for 15 minutes to irradiation via three ultraviolet lamps of actinic type (Philipps TLADK 30 W 05 type), with the intensity of the lamps, located above the horizontal glass confining plate, progressively increasing from 330 watts/$m^2$ to 1000 watts/$m^2$. After 15 minutes of irradiation, a thin rubbery layer having a thickness of 4.5 to 5 mm was obtained.

Analysis of the powder obtained after shredding and drying confirmed that it contained 0.3 to 0.5% of residual acrylamide.

A reduction in the amount of the residual acrylamide to 0.034% was carried out utilizing the process of the invention, thus: the thin rubbery layer was brush coated following stripping from the plate on both face surfaces with a powder of neutral sodium sulfite having an average grain size of 0.1 mm. For this purpose, 0.5 to 0.9% by weight of sodium sulfite, with respect to the total weight of the rubbery layer, was employed.

The coated layer was then cut into strips and said strips introduced into a shredder and there shredded. The flakes obtained were dried at 75° C. for 45 minutes. The granules thus obtained were ground into a powder having a grain size of less than 1 mm.

The resultant powder contained 0.034% acrylamide and was perfectly white. Same dissolved very rapidly to provide a highly viscous solution having a concentration of 0.5% in the pure water, the Brookfield viscosity thereof being greater than 2500 cps.

EXAMPLE 2

A solution was prepared from the following ingredients:

[i] Water: 157 g,
[ii] Acrylamide: 144 g,
[iii] Isopropanol: 0.14 ml, and
[iv] Sodium gluconate: 1.8 g.

To this solution, 1.27 ml of a solution of 34 g/l benzoin isopropyl ether in acrylic acid was added. The pH was adjusted to 9.5 by addition of a 10% sodium hydroxide solution. The operation was then continued as set forth in Example 1, with the intensity of the lamps progressively increasing from 660 watts/$m^2$ to 1000 watts/$m^2$.

The rubbery layer obtained was coated with 0.8% by weight, with respect to the total weight of the rubbery layer, of a mixture containing 50% $Na_2CO_3$ and 50% sodium sulfite, with the grain size of said admixture being 0.1 mm. After shredding, drying at 45° C. for approximately 1 hour and grinding, a powder containing less than 0.05% acrylamide was obtained.

For purposes of comparison, a thin rubbery layer which had not been treated with the $Na_2CO_3/Na_2SO_3$ admixture evidenced an amount of residual acrylamide monomer in the product ground powder of 0.15%.

The same rubbery layer coated without the $Na_2CO_3$ being present, i.e., coating the rubbery layer only with $Na_2SO_3$, yielded a greyish powder which upon dissolution in water formed slightly opalescent solutions, thus indicating the presence of insolubles. Furthermore, ultimate viscosities in this case were lower; for example, when sodium sulfite alone was used, for a 0.5% by weight solution of polymer in water containing 5% salt from sea water, a viscosity of 100 cps was obtained, whereas 120 cps resulted when the $Na_2CO_3$-$Na_2SO_3$ admixture was employed.

EXAMPLE 3

A solution was prepared from the following ingredients:
[i] Water: 162 g,
[ii] Acrylamide: 118.6 g,
[iii] Sodium gluconate: 3.2 g,
[iv] Isopropanol: 0.4 ml, and
[v] Ethyltrimethylammonium methacrylate chloride: 16.2 g.

To this solution, 1.16 ml of a solution of 34 g/l benzoin isopropyl ether in methanol was added. The pH was adjusted to 8 with 10% ammonia. Photopolymerization was effected as in Example 2. The resulting rubbery layer was coated with 0.7 to 0.9% admixture of 60% $Na_2CO_3$ and 40% $Na_2SO_3$, and was then shredded and dried at 75° C. for 1 hour. After grinding, a completely water-soluble powder containing 0.05% acrylamide was obtained.

For purposes of comparison, the aforesaid procedure was repeated, but without dusting the rubbery layer with the $Na_2CO_3$/$Na_2SO_3$ admixture, and a powder containing 0.41% acrylamide was obtained.

On the other hand, when only the sodium sulfite was used, without the sodium carbonate, a powder was obtained which dissolved less readily and which comprised an insoluble fraction.

When the $Na_2CO_3$ was replaced by ammonium carbonate, exactly the same results were obtained as with the $Na_2CO_3$ admixture.

EXAMPLE 4

A solution was prepared from the following ingredients:
[i] Water: 127.7 g,
[ii] Ethyltrimethylammonium methacrylate chloride: 39.5 g,
[iii] Acrylamide: 129 g, and
[iv] Sodium gluconate: 3.9 g.

To this solution, 1.9 ml of a solution of 34 g/l isopropyl ether in an equal volume of a mixture of methanol and isopropanol were added. The pH was adjusted to 7 with 10% ammonia. Photopolymerization was effected as in Example 2 and the rubbery layer was coated with a mixture of 60% $Na_2CO_3$ and 40% $Na_2SO_3$. After shredding, drying and grinding, a white powder providing a clear aqueous solution and containing 0.05% acrylamide, was obtained.

For purposes of comparison, the procedure outlined above was repeated, but without including the treatment of the rubbery layer with the $Na_2CO_3$/$Na_2SO_3$ admixture; a powder containing 0.15% residual acrylamide monomer was obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the removal of residual monomer from the thin, adhesive, rubbery layer resulting from the photopolymerization of a thin layer of an aqueous solution of acrylic monomer selected from the group consisting of acrylamide, acrylic acid and methacrylic acid and the salts and esters thereof, aminoalkylacrylate and aminoalkylmethacrylate and quaternaries thereof, acrylonitrile, hydroxyalkylacrylate and hydroxylalkylmethacrylate, and mixtures thereof, comprising coating at least one face surface of such thin rubbery, adhesive layer with a powder comprising at least one member selected from the group consisting of an alkali metal sulfite and an alkali metal bisulfite, comminuting said coated, thin rubbery, adhesive layer so as to admix inner and outer portions of said layer, extruding said comminuted and admixed layer to form particulates, and drying and grinding the particulates.

2. The process as defined in claim 1, said ground particulates having a content in residual monomer of less than 0.05% by weight.

3. The process as defined by claim 1, said powder having a grain size of less than 0.1 mm.

4. The process as defined by claims 1, said coating comprising from about 0.1% to 3% by weight of the total weight of said thin rubbery layer.

5. The process as defined by claim 4, said coating comprising from about 0.3% to 2% by weight of the total weight of said thin rubbery layer.

6. The process as defined by claim 4, said at least one member being sodium sulfite, sodium bisulfite, or admixtures thereof.

7. The process as defined by claim 4, said coating further comprising a member selected from the group consisting of an alkali metal carbonate and an ammonium carbonate.

8. The process as defined by claim 7, said coating comprising up to 60% by weight of said carbonate.

9. The process as defined by claim 8, said carbonate being sodium carbonate.

10. The process as defined by claim 8, said carbonate being ammonium carbonate.

11. The process as defined by claim 7, said aqueous solution photopolymerized having a pH of less than 12.

12. The process as defined by claim 1, said aqueous solution photopolymerized having a pH of greater than 12.

13. The process as defined by claim 1, said aqueous solution photopolymerized having a thickness of from about 2 to 20 mm.

14. The process as defined by claim 1, said aqueous solution photopolymerized comprising a catalyzing amount of a photoinitiator.

15. The process as defined by claim 1, said monomer being acrylamide.

16. The process as defined by claim 1, both face surfaces of said thin rubbery layer being coated.

17. The process as defined in claim 1, wherein the concentration of said acrylic monomer in said aqueous solution ranges between about 40 to 60 percent by weight.

* * * * *